United States Patent
Imai

(10) Patent No.: US 8,559,024 B2
(45) Date of Patent: Oct. 15, 2013

(54) IMAGE FORMING METHOD, IMAGE FORMING APPARATUS, AND PROGRAM

(75) Inventor: Hitoshi Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 12/706,485

(22) Filed: Feb. 16, 2010

(65) Prior Publication Data

US 2010/0142002 A1    Jun. 10, 2010

Related U.S. Application Data

(62) Division of application No. 10/994,126, filed on Nov. 19, 2004, now abandoned.

(30) Foreign Application Priority Data

Nov. 21, 2003  (JP) ................................. 2003-392726

(51) Int. Cl.
*H04N 1/40*    (2006.01)

(52) U.S. Cl.
USPC ........... 358/1.11; 358/462; 358/2.1; 358/1.13

(58) Field of Classification Search
USPC .................. 382/318; 358/1.15, 1.13, 2.1, 462
See application file for complete search history.

(56) References Cited

U.S. PATENT DOCUMENTS

| 5,675,672 A * | 10/1997 | Nakabayashi | 382/318 |
| 6,842,263 B1 * | 1/2005 | Saeki | 358/1.15 |
| 2004/0080770 A1 * | 4/2004 | Hirose et al. | 358/1.13 |
| 2011/0022567 A1 * | 1/2011 | Sarma et al. | 707/639 |

FOREIGN PATENT DOCUMENTS

JP            07186466 A   *   7/1995

OTHER PUBLICATIONS

English translation of JP 07186466 A.*

* cited by examiner

*Primary Examiner* — King Poon
*Assistant Examiner* — Iriana Cruz
(74) *Attorney, Agent, or Firm* — Canon U.S.A., Inc., IP Division

(57) ABSTRACT

There is provided an image processing method including an extraction step of extracting text data and image forming data based on an image processing apparatus control code as a job, and a storing step of relating the information of the job, the text data, and the image forming data to each other and storing them in a memory unit.

9 Claims, 19 Drawing Sheets

HOST          SERVER          LBP

HOST                          LBP

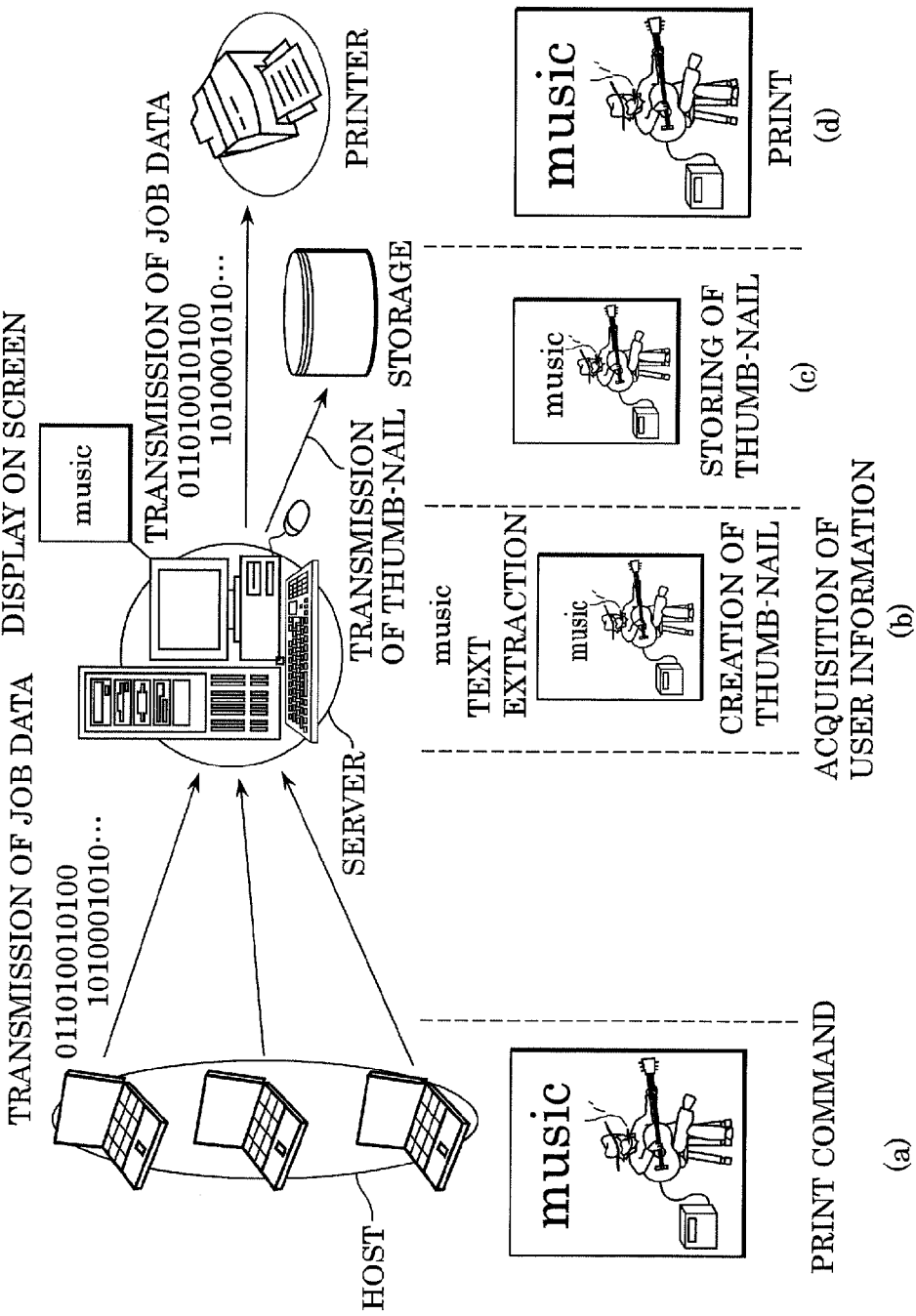

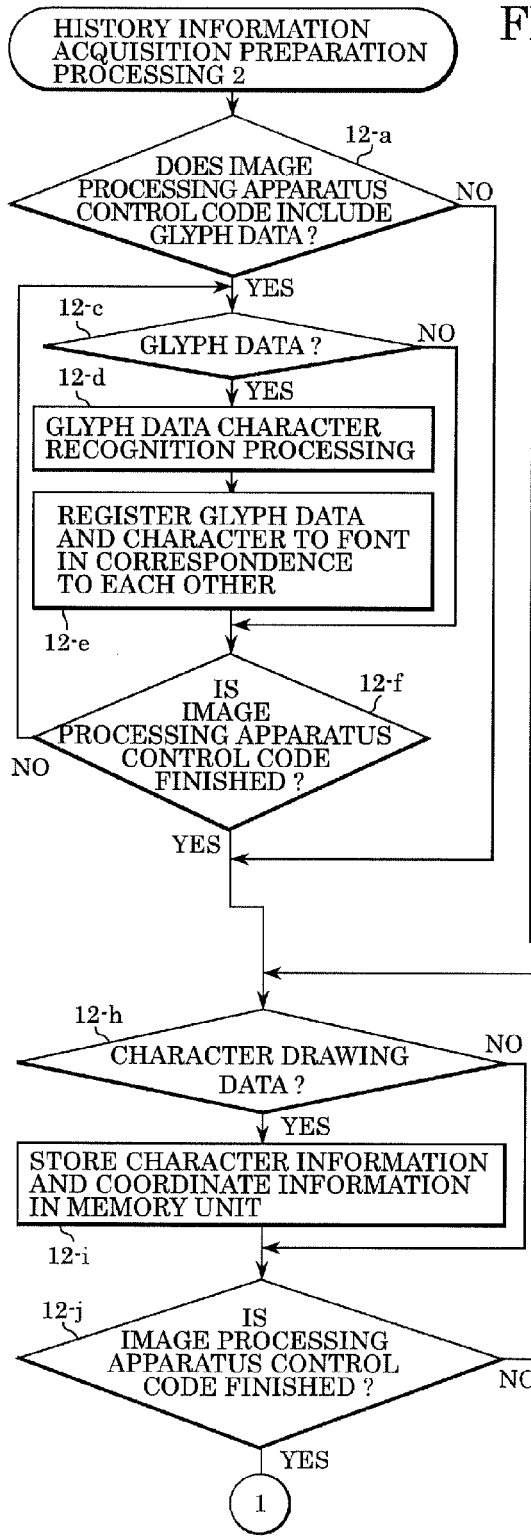
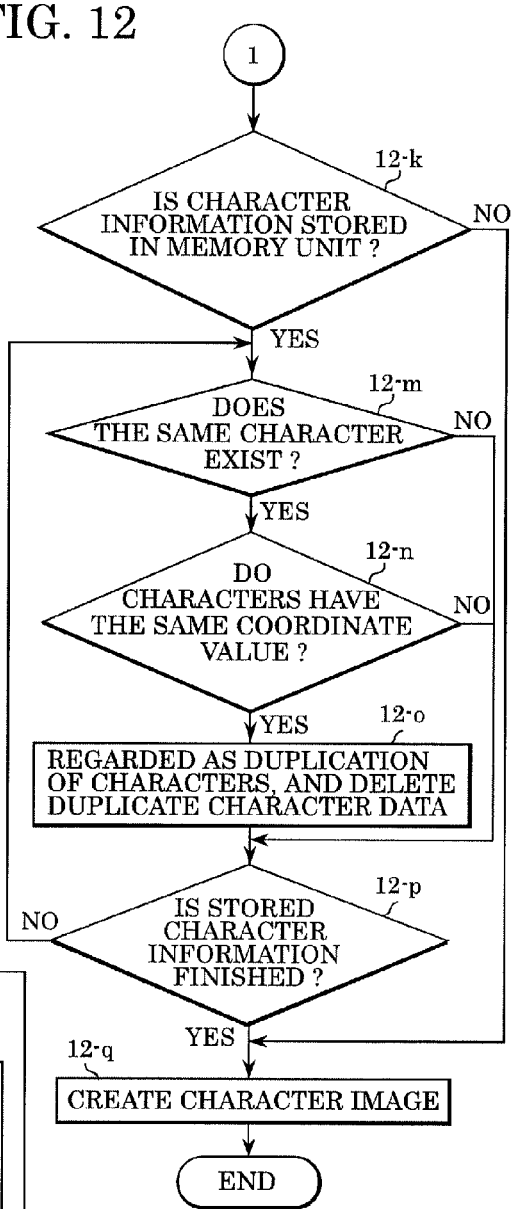
FIG. 12

FIG. 17

STORE TO SERVER

| Job ID |
| --- |
| IP INFORMATION OF JOB TRANSMISSION TERMINAL |
| TEXT DATA |
| THUMB-NAIL |

(a)

STORE TO SERVER

| Job ID |
| --- |
| IP INFORMATION OF JOB TRANSMISSION TERMINAL |
| TEXT DATA |

STORE TO EXTERNAL SERVER

| Job ID |
| --- |
| THUMB-NAIL |

(b)

| Job 1 |
| --- |
| IP=192.168.0.10 |
| text= ABC |
| THUMB-NAIL |
| Job 2 |
| IP=192.168.0.3 |
| text= FGH |
| THUMB-NAIL |
| Job 3 |
| IP=192.168.0.51 |

```
JOB START COMMAND

CHARACTER REGISTRATION COMMAND
CHARACTER ID=10
GLYPH DATA={16, 23, 13, ···, 10}

CHARACTER DRAWING COMMAND
CHARACTER ID=10
matrix={a=2  b=0  c=0  d=2  tx=100  ty=100}

JOB END COMMAND
```

IMAGE FORMING METHOD, IMAGE FORMING APPARATUS, AND PROGRAM

CROSS REFERENCE OF RELATED APPLICATIONS

This application is a divisional of U.S. application Ser. No. 10/994,126 filed Nov. 19, 2004 which claims priority from Japanese Patent Application No. 2003-392726 filed Nov. 21, 2003, both of which are hereby incorporated by reference in their entireties herein.

BACKGROUND OF THE INVENTION

1. Field of the Invention

The present invention relates to image processing, and more specifically, to image processing executed by an image forming apparatus control code.

2. Description of the Related Art

When a specific job is searched from a job history in an image processing system for executing image processing by sending an image processing apparatus control code from a host to an image processing apparatus, there are conventionally a system, a method, and the like that store a document name or a file name, an application name, a user name, a print date, and the like that relate to a print job as the job history and search print data from the job history.

Further, Japanese Patent Laid-Open No. 2003-67149 described below discloses a technology for extracting text information when a job is printed and storing the text data together with the job.

However, when it is desired to search a document having specific contents although the document name and the author of a printed document are unknown, and when it is desired to selectively display the contents of a print job on a screen of a print server, and the like, it is difficult to display the contents by the conventional technology or it is necessary to search and display the contents by forming the images of the stored print job one by one, from which a problem arises in that a large load is put on a user.

SUMMARY OF THE INVENTION

An aspect of the present invention is to make it possible to search print information based on the semantic contents of stored documents.

Another aspect of the present invention is to make it easy to manage print data by managing it in a wide variety of fashions in a print data search system based on the semantic contents of stored documents.

Still another aspect of the present invention is to prevent the duplicate extraction of text information which is extracted from band data to recognize semantic contents when print information is searched based on the semantic contents of stored documents in a band print system.

An image processing method of the present invention includes an extraction step of extracting text data and image forming data based on an image processing apparatus control code as a job and a storing step of relating the information of the job, the text data, and the image forming data to each other and storing them in a memory unit.

Other features and advantageous of the present invention will be apparent from the following description taken in conjunction with the accompanying drawings, in which like reference characters designate the same or similar parts throughout thereof.

BRIEF DESCRIPTION OF THE DRAWINGS

FIG. 5 is a view showing an example of an image of history information acquisition processing according to a first example in respective devices of an image processing system;

FIG. 12 is a flowchart showing an example of a history information acquisition preparation processing flow according to the second example executed in history information management processing;

FIG. 17 is a view showing an example of a history information structure according to the embodiment;

FIG. 19 is a view showing an example of an image processing apparatus control code for drawing a character according to the embodiment.

DESCRIPTION OF THE EMBODIMENTS

An embodiment of the present invention will be explained below in more detail using the figures by applying the embodiment to a laser beam printer (hereinafter, abbreviated as LBP).

<Outline of LBP>

Figure 1:
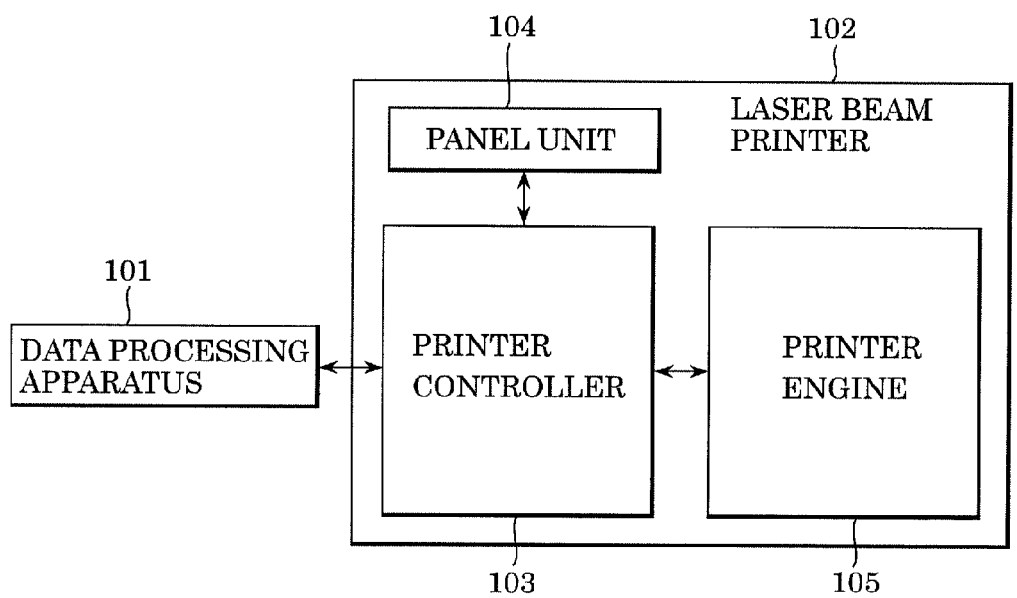
FIG. 1 is a view schematically showing a system arrangement of an image recording device according to an embodiment.

FIG. 1 is a view showing the outline of a system arrangement of an image recording device according to the embodiment of the present invention.

In FIG. 1, a data processing device 101 is, for example, a computer which acts as a source for supplying an image processing apparatus control code or a controller of an image recording device 102. In this embodiment, the LBP is used as the image recording device 102. The image recording device applied to the embodiment is not limited to the LBP and other print type printers, such an inkjet printer and the like, may be applied thereto.

A printer controller 103 creates raster data for each page based on image information in an image processing apparatus control code (for example, ESC (Escape) code, page description language, band description language, and the like) supplied from the data processing device 101 and sends the raster data to a printer engine 105.

The printer engine 105 forms a latent image on a photosensitive drum based on the raster data supplied from the printer controller 103 and records an image by transferring and fixing the latent image on a recording medium (electrophotographic system).

A panel section 104 is used as a user interface. A user can indicate a desired operation by manipulating the panel section 104. Further, the contents processed by the printer 102 and warning messages for the user are displayed on the panel section 104.

Figure 2:
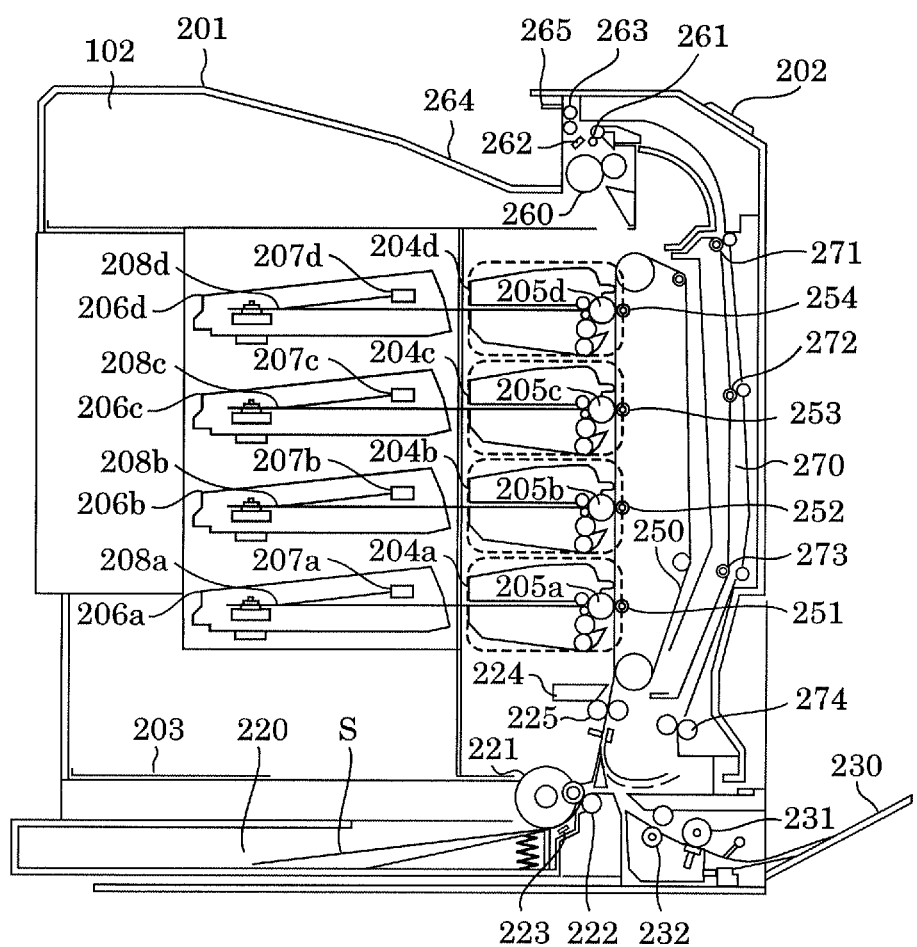
FIG. 2 is a sectional view showing an arrangement example of a printer according to the embodiment.

FIG. 2 is a sectional view illustrating the color printer 102 employing a tandem system. The color printer shown in FIG. 2 includes a printer cabinet 201 and a manipulation panel 202 on which switches, LED displays, LCD displays, and the like are disposed. The manipulation panel 202 is one mode of the panel section 104 shown in FIG. 1. The switches are used by the user to give various commands, and the LED displays, LCD displays, and the like display messages and the contents set to the printer. The color printer 102 shown in FIG. 2 also includes a board accommodating portion 203 in which a board constituting the electronic circuits of a video controller 103 and the printer engine 105 is accommodated.

A sheet cassette 220 is used for holding sheets (recording mediums) S and includes a mechanism for electrically detecting a sheet size by a partition (not shown). A cassette clutch 221 having a cam is used for taking out an uppermost one of the sheets S placed on the sheet cassette 220 and transporting the taken-out sheet S to a sheet feed roller 222 by the drive force transmitted from a drive mechanism (not shown). The cam is intermittently rotated every time a sheet is fed and feeds one sheet S in correspondence to one rotation thereof. A sheet sensor 223 detects the amounts of sheets S held on respective sheet cassettes 220.

The sheet feed roller 222 is a roller for transporting the leading edge of the sheet S up to a resist shutter 224 that can stop the feed of the sheet S by pressing it.

A manual sheet feed clutch 231 is used to transport the extreme end of a sheet S up to a manual sheet feed roller 232 which is used to transport the extreme end of the sheet S up to the resist shutter 224. The sheet S, which is used to record an image, is fed by selecting a sheet feeder, for example, the sheet cassette 220 or a manual tray 230.

The printer engine 105 executes a communication with the printer controller 103 according to a predetermined communication protocol, selects any one sheet feeder from the sheet cassette 220 and the manual tray 230 according to a command from the printer controller 103, and transports a sheet S up to the resist shutter 224 by the corresponding sheet feeder in response to a print start command. The printer engine 105 includes the sheet feeder, a mechanism relating to an electronic photographing process, such as the formation, transfer, fixing, and the like, of a latent image, a sheet discharger, and a controller thereof.

Image recording sections 204a, 204b, 204c, and 204d include photosensitive drums 205a, 205b, 205c, and 205d, toner holders, and the like and form a toner image on a sheet S using an electrophotographic process. In contrast, laser scanner sections 206a, 206b, 206c, and 206d are used for supplying image information to the image recording sections through laser beams.

A sheet transportation belt 250, which transports a sheet S, is flatly stretched by a plurality of rollers 251 to 254 along the image recording sections 204a, 204b, 204c, and 204d in a sheet feed direction (in an up direction from the lower portion of the figure). The sheet is electrostatically absorbed to the sheet transportation belt 250 at the uppermost stream portion thereof by absorption rollers 225 to which a bias is applied. Further, four photosensitive drums 205a, 205b, 205c, and 205d are linearly disposed in confrontation with the transportation surface of the sheet transportation belt 250, and an image forming mechanism is arranged. A charge application unit and a development unit are sequentially disposed around the vicinity of the photosensitive drum of each of the image recording sections 204a, 204b, 204c, and 204d.

In the laser scanner sections 206a, 206b, 206c, and 206d, laser units 207a, 207b, 207c, and 207d emit laser beams by driving built-in semiconductor lasers according to an image signal (/VIDEO signal) sent from the printer controller 103. The laser beams emitted from the laser units 207a, 207b, 207c, and 207d are scanned by polygon mirrors (rotary polyhedral mirrors) 208a, 208b, 208c, and 208d and form latent images on the photosensitive drums 205a, 205b, 205c, and 205d.

A fixing unit 260 thermally fixes the toner images formed on the sheet S by the image recording sections 204a, 204b, 204c, and 204d on the recording sheet S. Transportation rollers 261 are used for discharging the sheet S. A discharge sheet sensor 262 is used for detecting a discharging state of the sheet S. A sheet discharge roller 263 acts as a both sides print transportation path switching roller 263 which transports the sheet S in a sheet discharge direction and discharges it to a discharged sheet tray 264 as it is when it is indicated to discharge the sheet S. In contrast, when it is indicated to transport both the sides of the sheet S, the roller 263 is switched back by inversing its rotational direction just after the rear end of the sheet S passes through the discharge sheet sensor 262 so as to transport the sheet S to a both sides print transportation path 270. A load of discharged sheet sensor 265 is used for detecting the load of sheets S placed on the sheet discharge tray 264.

The sheet S, which is transported to the both sides print transportation path 270 by the roller 263 for both sides print, is transported again up to the resist shutter 224 by both sides transportation rollers 271-274 and waits for a command for the transportation of it to the image recording sections 204a, 204b, 204c, and 204d.

The printer 102 may be further provided with option units such as an option cassette, an envelope feeder, and the like.

Figure 3:
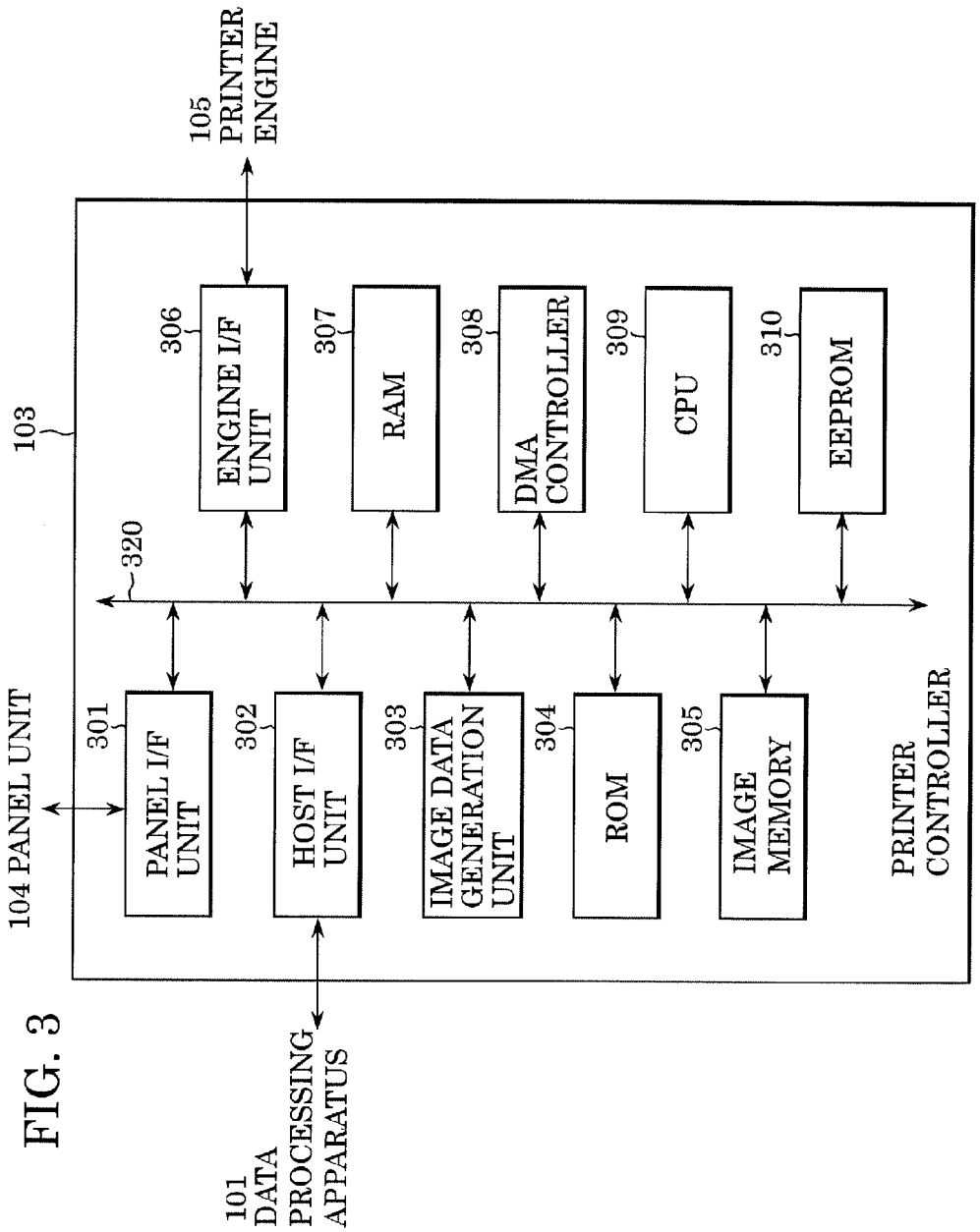
FIG. 3 is a block diagram showing an arrangement example of a printer controller according to the embodiment.

FIG. 3 is a block diagram showing an arrangement example of the printer controller 103. The printer controller shown in FIG. 3 includes a panel interface unit 301 for executing a data communication with the panel section 104. A CPU 309 can confirm the contents which are set and indicated by the user on the panel section 104 through the panel interface unit 301. A host interface unit 302 connects the data processing device 101 such as a host computer and the like through a network so that it can execute a bidirectional communication. An engine interface unit 306 is connected to the printer engine 105 for a communication. The CPU 309 can recognize a state of the printer engine 105 through the engine interface unit 306.

An image data generation unit 303 is used for creating (rasterizing) raster data to be supplied to the printer engine 105 on an image processing apparatus control code supplied from the data processing device 101. An image memory 305 temporarily stores the created raster data. The CPU 309 controls devices connected to a CPU bus 320 based on a control program code stored in a ROM (read-only memory) 304. A RAM (random-access memory) 307 acts as a temporarily storing memory used by the CPU 309. The RAM 307 is arranged such that the memory capacity thereof can be increased by an optional RAM connected to an expansion port (not shown). The RAM 307 is used as a drawing object storing unit for storing drawing objects, a work memory temporarily used by a control program stored in the ROM 304, and the like. An EEPROM (Electrically Erasable Programmable Read-Only Memory) 310 is composed of a non-volatile memory for storing control information such as a density correction table and the like. A DMA (direct memory access) controller 308 is used for transferring the raster data in the image memory 305 to the engine interface unit 306 in response to a command from the CPU 309.

A CPU bus 320 includes addresses, data, and control buses. The panel interface unit 301, the host interface unit 302, the image data generation unit 303, the ROM 304, the image memory 305, the engine interface unit 306, the RAM 307, the DMA controller 308, the CPU 309, and the EEPROM 310 can access all the devices connected to the CPU bus 320.

First Example

An example of history information processing in an image processing system using the LBP explained in the above embodiment will be explained next with reference to FIGS. 4 to 10.

Figure 6:
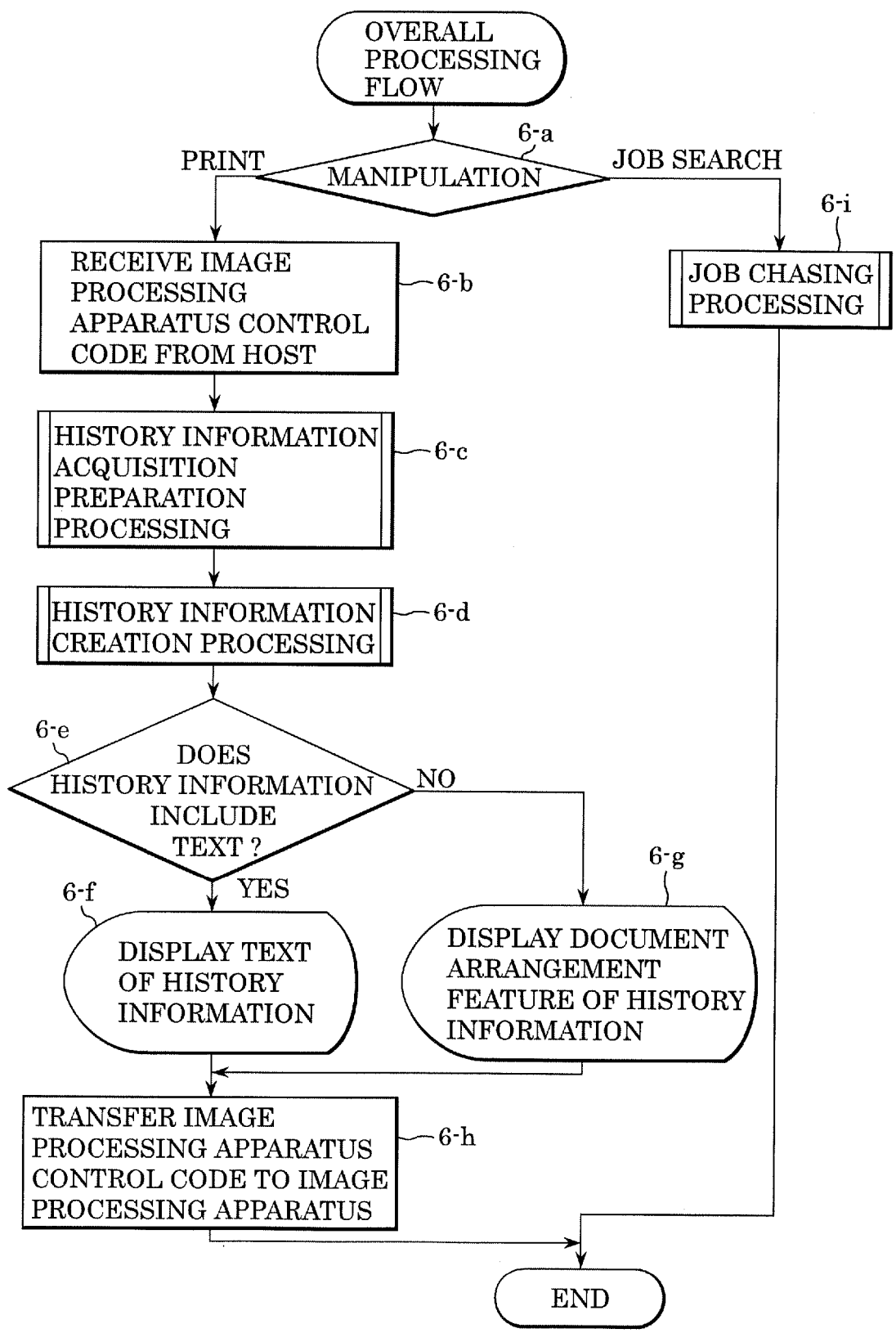
FIG. 6 is a flowchart showing an example of an overall processing flow of history information management processing according to the first example executed by a history information management device.
Figure 7:
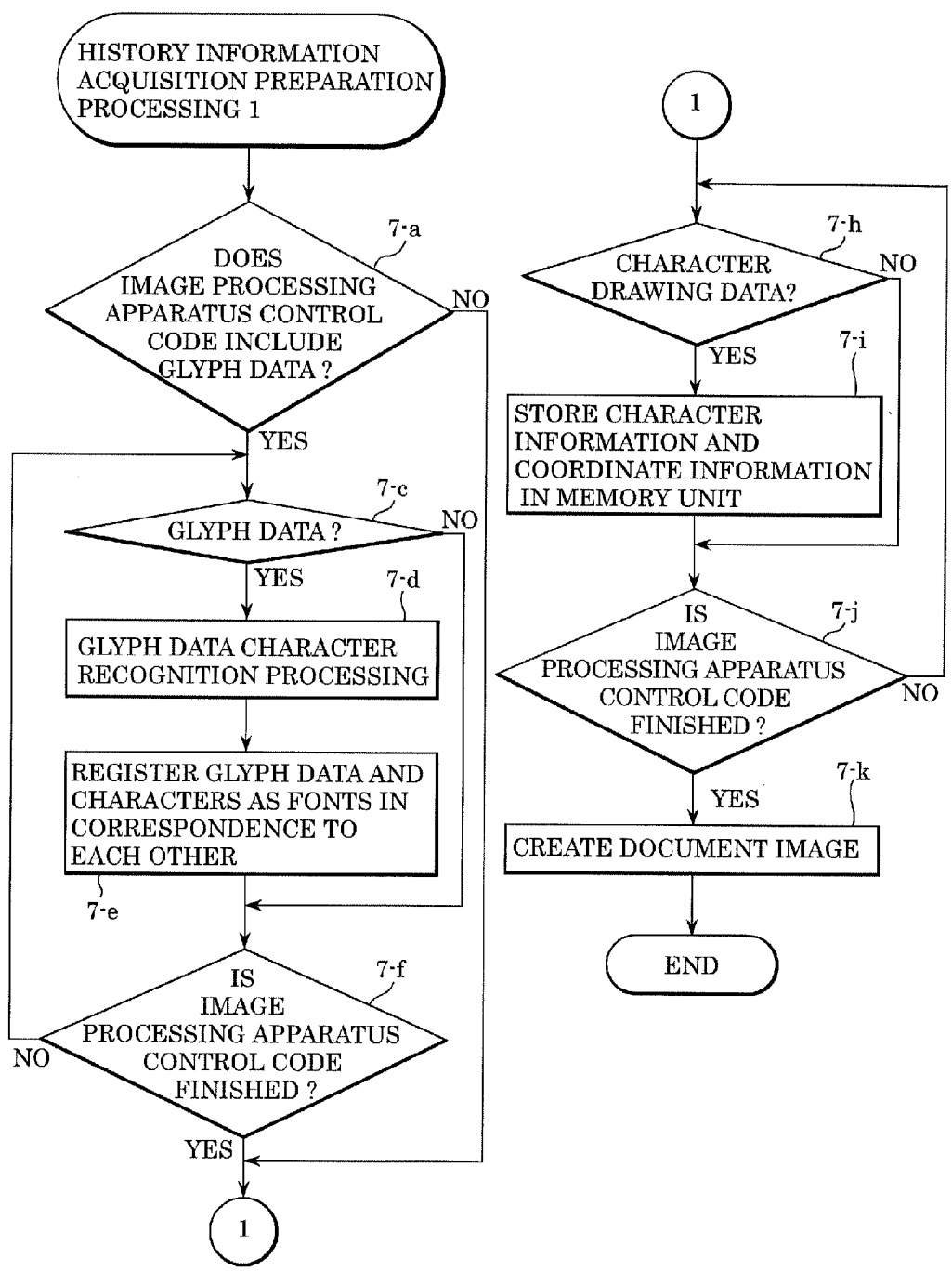
FIG. 7 is a flowchart showing an example of a history information acquisition preparation processing flow according to the first example executed in history information management processing.
Figure 8:
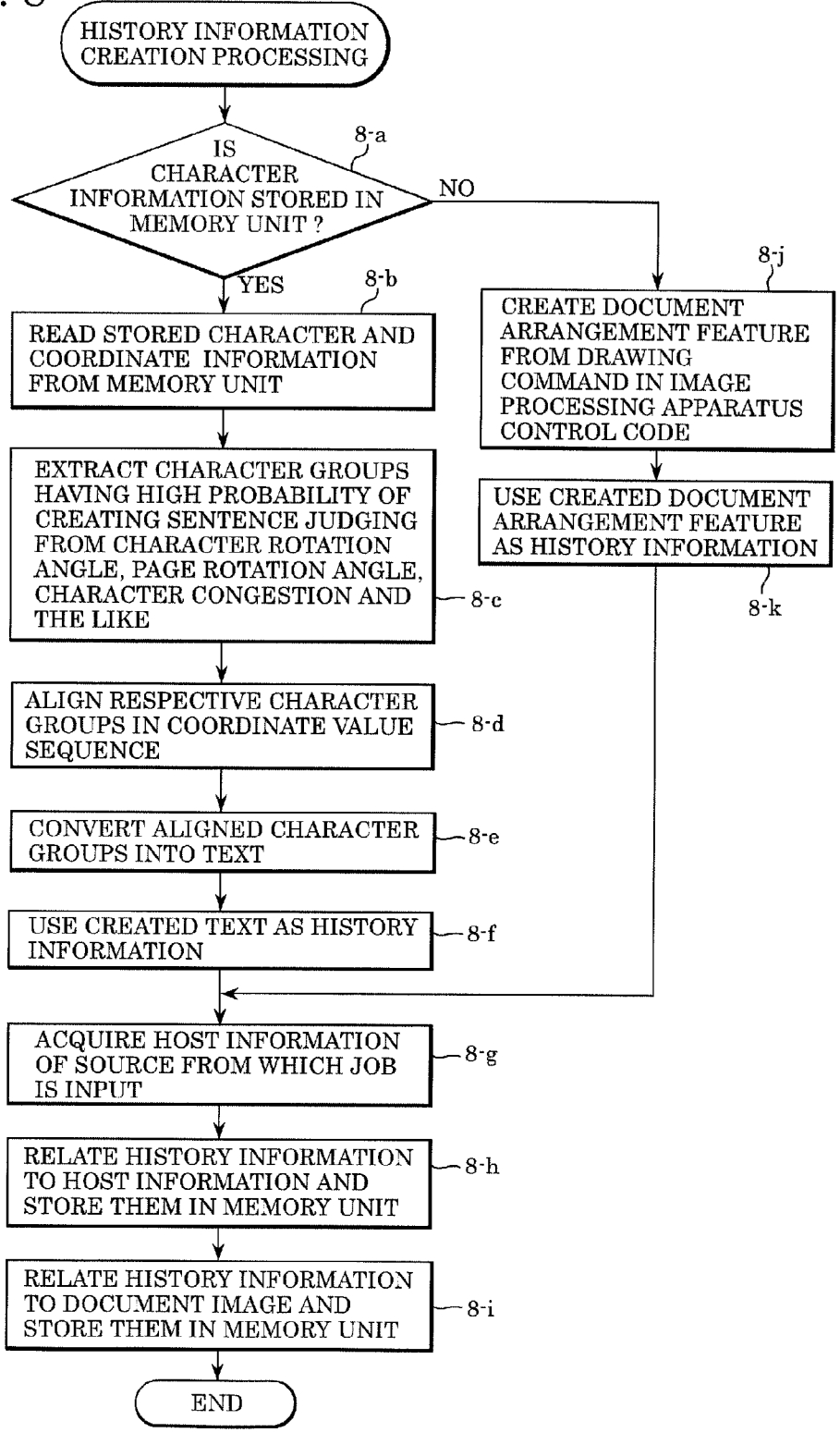
FIG. 8 is a flowchart showing an example of a history information creation processing flow according to the first example executed in the history information management processing.
Figure 9:
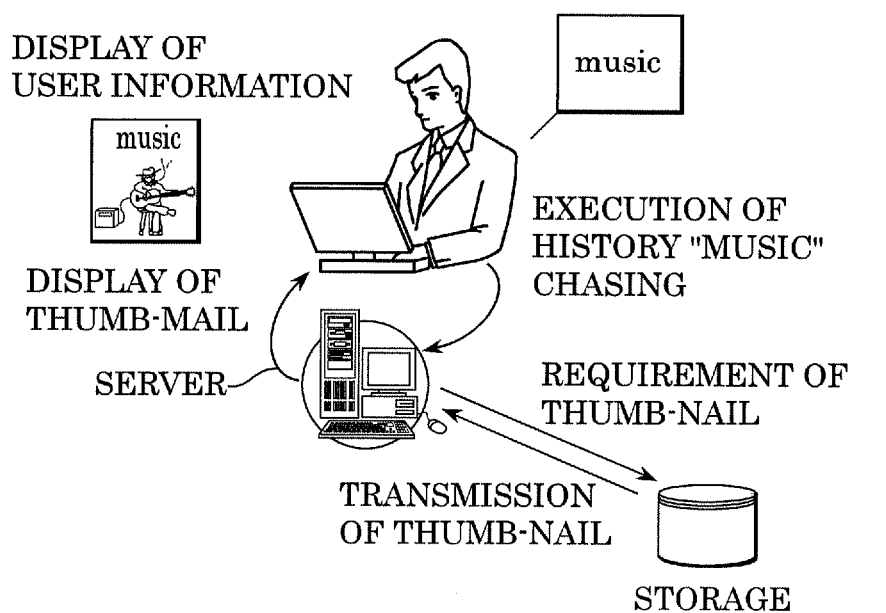
FIG. 9 is a view showing an example of the concept of job search processing (job chasing) according to the first example.
Figure 10:
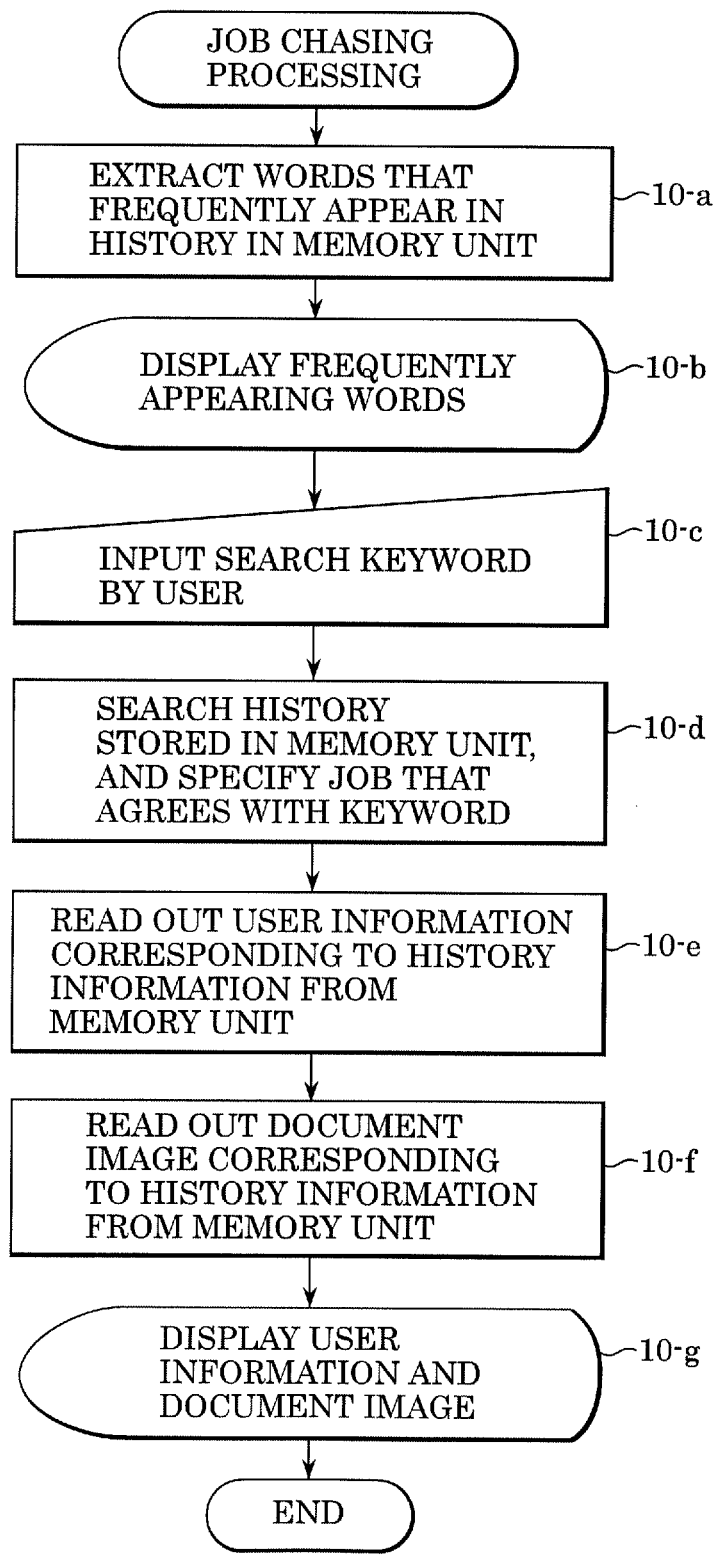
FIG. 10 is a flowchart showing an example of a job chasing processing flow according to the first example executed in the history information management processing.

FIG. 4 illustrated an example of the device arrangement of the image processing system. FIG. 5 illustrates an example of an image of history information acquisition processing in the respective devices of the image processing system, wherein (a) to (d) show the contents of processing executed by the respective devices. FIG. 6 is a flowchart showing an example of an overall processing flow of history information management processing executed by a history information management device, wherein 6-a to 6-i show respective steps. FIG. 7 is a flowchart showing an example of a history information acquisition preparation processing flow executed in the history information management processing, wherein 7-a to 7-k show respective steps. FIG. 8 is a flowchart showing an example of a history information creation processing flow executed in the history information management processing, wherein 8-a to 8-k show respective steps. FIG. 9 illustrates an example of the concept of job search processing (job chasing). FIG. 10 is a flowchart showing an example of a job chasing processing flow executed in the history information management processing, wherein 10-a to 10-g show respective steps.

Figure 4A:
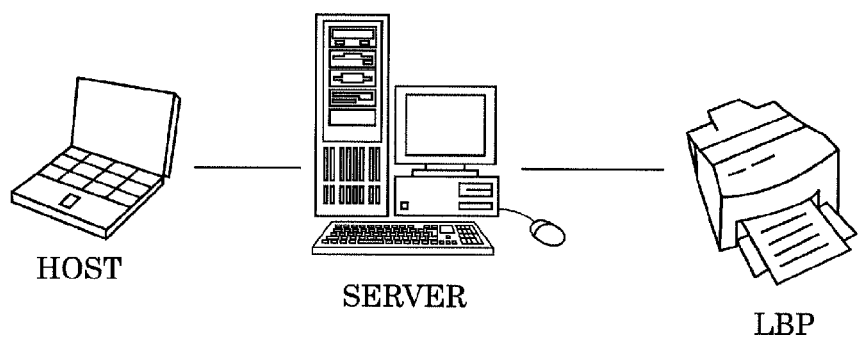
FIG. 4 is a view showing a device arrangement example of an image processing system according to the embodiment.
Figure 4B:
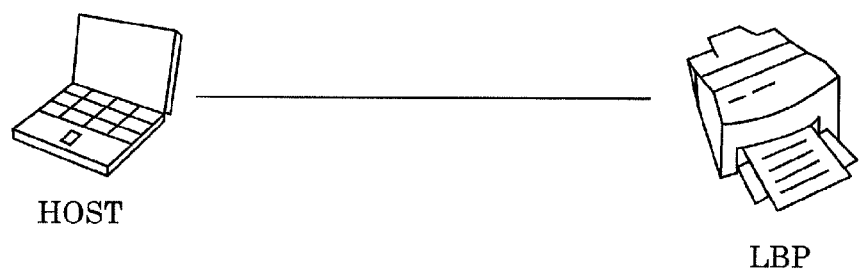

FIG. 4 shows device arrangement examples of the image processing system. FIG. 4A shows a host connected to the LBP through a server. The history information management device may be built in any of the host, the server, and the LBP. In exemplary embodiments, the history information management device is built in the server because the host creates an image processing apparatus control code and the LBP forms an image. In FIG. 4A, the server is shown as a device having the outside appearance of a terminal, however, the server need not include a terminal. FIG. 4B shows the host connected to the LBP without any unit interposed therebetween, and the history information management device is built in any of the host and the LBP.

Next, an overview of the history information acquisition processing executed by the respective devices of the image processing system will be explained using FIG. 5. The host receives a print command from the user in (a) of the figure, creates job data (image processing apparatus control code), and transmits the job data to the server. In this example, text is included in the job data. The text is extracted and a thumb-nail is created from the job data received by the server in (b) of the figure. The text extracted as history information is shown on the screen of the server, the history information, the data as to a user who input a job, and the thumb-nail are related to each other, and the history information is stored in a memory unit of the server. The thumb-nail is transmitted to a storage device, and the job data is transmitted to the LBP. The storage device stores the thumb-nail received in (c) of the figure. The LBP executes print processing by creating an image from the job data received in (d) of the figure.

The structure of the history information relating to the example will be explained with reference to FIG. 17. In FIG. 17, (a), (b), and (c) show an example of the arrangement of the history information.

In FIG. 17, (a) shows history information as to one job. The history information is composed of a job ID (identification), IP (Internet protocol) information of a terminal that sends the job as user information, a part of text in the job, and thumb-nail data having such a degree as to allow the outline of the job to be recognized. FIG. 17 shows that the history information is stored in the server. With the above structure, the terminal from which the job is transmitted can be specified by the job ID, the text in the job, and the thumb-nail of the job. In the above arrangement, however, it is anticipated that the data size of the thumb-nail becomes greatly larger than that of the other information, from which a drawback may occur in that a good amount of time is taken to manage the history information. In FIG. 17, (b) shows an example of the arrangement of the history information for overcoming the drawback. It is shown in (b) of FIG. 17 that the job ID, the IP information of the terminal from which the job is sent, and a part of the text in the job are stored in the server, and the job ID and the thumb-nail are stored in an external server. With the above arrangement, the information of a terminal from which a job including any text can be searched by searching only the history information stored in the server, and it is not necessary to search the history information in the external server in which the thumb-nail is stored.

In FIG. 17, (c) shows an example in which the arrangement of the history information shown in (b) is stored for a plurality of jobs. In the example shown, a terminal from which a job including, for example, text "fgh" is sent is a terminal from which a job 2 is sent, and the IP information of the terminal is 192.168.0.3.

Next, the overall processing flow of the history information management processing executed by the history information management device will be explained using FIG. 6. The processing starts when any manipulation (event) is received. The type of the received manipulation (event) is determined at step 6-a. When the manipulation is job search processing, the process goes to step 6-i where job chasing processing is performed. FIG. 10 is a flowchart illustrating details of exemplary job chasing processing and is described later. Processing of FIG. 6 then ends. On the other hand, when the manipulation is print processing, the process goes to step 6-b. The job data (image processing apparatus control code) is received from the host at step 6-*b* and history information acquisition preparation processing is executed at step 6-*c*. FIG. 7 is a flow chart illustrating details of exemplary history information acquisition preparation processing and is described later. History information creation processing is then executed at step 6-*d*. FIG. 8 is a flowchart illustrating details of exemplary history information creation processing and is described later. Whether or not the history information includes text is determined at step 6-*e*. When the history information includes text, the process goes to step 6-*f*, and when the history information does not include text, the process goes to step 6-*g*. The text in the history information is displayed at step 6-*f*. Since no text is included in the history information at step 6-*g*, a document arrangement feature (thumb-nail and the like) is displayed on the screen. Next, in 6-*h*, the job data is sent to the image recording device (LBP) and the processing of FIG. 6 is finished.

Character drawing executed by the LBP exemplified in the example can be broadly classified into two methods. One method is a case in which the LBP includes glyph data (information for constituting fonts in the LBP). In this case, the glyph data, which is data showing character shapes, is stored in, for example, a font ROM. Accordingly, when the host desires to cause the LBP to draw a character using the image processing apparatus control code, a character ID in the font ROM is designated. A second method is a case in which the LBP does not include glyph data. In this case, the host creates an image processing apparatus control code including data, in which character IDs are caused to correspond to the glyph data, and further including the character IDs of characters that are desired to be drawn, the LBP receives the image processing apparatus control code, determines the glyph data to correspond with the character IDs, and stores them in the memory unit. When a character is drawn, the LBP reads out a character corresponding to a character ID from the glyph data stored in the memory unit and develops the character to an image.

Figure 18:
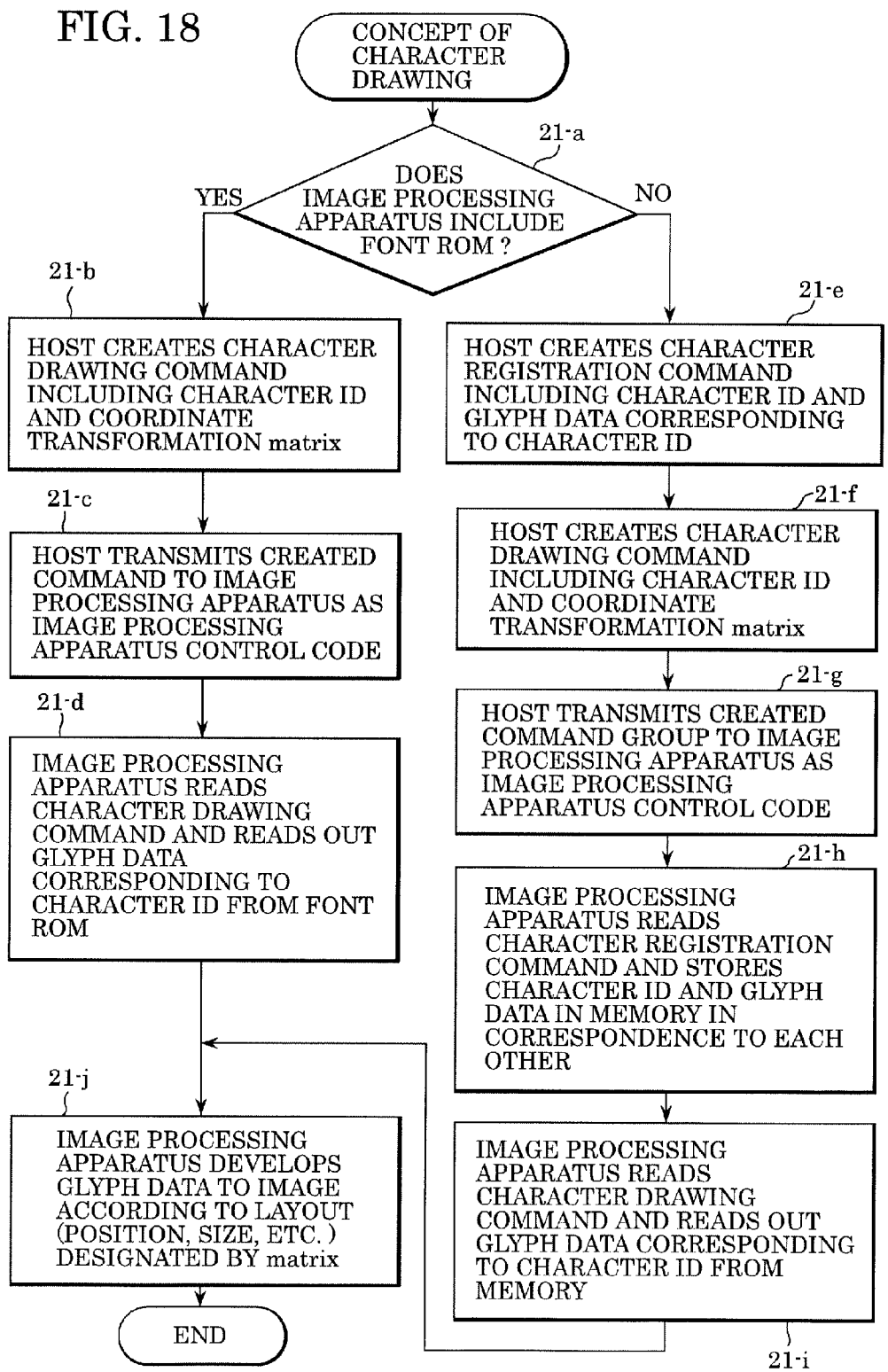
FIG. 18 is a flowchart showing an example of a flow showing the basic concept of character drawing according to the embodiment.

A character drawing concept in the example is described next with reference to FIGS. 18 and 19. FIG. 18 is a flowchart showing an example of a character drawing flow in the example, wherein 21-*a* to 21-*j* show respective steps. FIG. 19 shows an example of the image processing apparatus control code for drawing a character in the embodiment.

First, the character drawing flow will be explained using FIG. 18. The flow is roughly divided into two major flows depending on whether or not an image processing apparatus includes the font ROM in which the glyph data is stored as determined at step 21-*a*. When the image processing apparatus includes the font ROM, the process goes to step 21-*b*. The host creates a character drawing command including a character ID and a coordinate transformation matrix at step 21-*b*. The command created by the host is transmitted to the image processing apparatus as the image processing apparatus control code at step 21-*c*. The image processing apparatus reads the character drawing command and reads out the glyph data corresponding to the character ID from the font ROM at step 21-*d*. The process then goes to step 21-*j*. If it is determined in step 21-*a* that the image processing apparatus does not include the font ROM, the process goes to step 21-*e*. The host creates a character registration command including the character ID and the glyph data corresponding to the character ID at step 21-*e*. A character drawing command including the character ID and the coordinate transformation matrix is created at step 21-*f*. A command group created by the host is transmitted to the image processing apparatus as the image processing apparatus control code at step 21-*g*. The image processing apparatus reads the character registration command and stores the character ID and the glyph data in the memory unit by causing them to correspond with each other at step 21-*h*. The image processing apparatus reads the character drawing command and reads out the glyph data corresponding to the character ID at step 21-*i*. The process then goes to step 21-*j*. At step 21-*j*, the image processing apparatus draws a character by developing the glyph data to an image in a layout (position, size, and the like) designated by the matrix. The processing of FIG. 18 is then finished.

Next, an example of the image processing apparatus control code sent from the host to the image processing apparatus in the character drawing processing will be explained using FIG. 19. FIG. 19 shows an example of data when the image processing apparatus does not include the font ROM. The image processing apparatus control code includes a job start command for indicating the image processing apparatus to start a job, the job start command being followed by a character registration command, a character drawing command, and a job end command for finally indicating the end of job to the image processing apparatus. The character registration command is added with glyph data and character IDs for managing the glyph data as attribute information in order to register the shapes of characters to the image processing apparatus, the glyph data and the character ID acting as attribute information. The character drawing command is added with the character ID and a coordinate transformation matrix parameter (shown as matrix in the figure) as attribute information in order to develop registered characters to images. The image processing apparatus sequentially reads the image processing apparatus control code from the job start command to the job end command and executes processing according to the respective commands.

Next, the history information acquisition preparation processing flow executed in the history information management processing will be explained using FIG. 7. Whether or not the job data (image processing apparatus control code) includes the glyph data is determined at step 7-*a*. When the job data includes the glyph data, the process goes to step 7-*c*, and when it does not include the glyph data, the process goes to step 7-*h*. Processing for analyzing the image processing apparatus control code is repeated in a loop from step 7-*c* to step 7-*f*. When the glyph data is detected at step 7-*c*, the process goes to step 7-*d*, and when the glyph data is not detected at step 7-*c*, the process goes to step 7-*f*. The glyph data is subjected to character recognition processing at step 7-*d*, and the glyph data is caused to correspond with characters and registered as fonts at step 7-*e*. Whether or not the image processing apparatus control code is finished is determined at step 7-*f*. When it is not finished at step 7-*f*, the process returns to step 7-*c* and processes a next image processing apparatus control code, and when it is finished at step 7-*f*, the process goes to step 7-*h*. Processing for analyzing the image processing apparatus control code is repeated in the loop from step 7-*h* to step 7-*j*. When character drawing data is detected at step 7-*h*, the process goes to step 7-*i*, and when the character drawing data is not detected at step 7-*h*, the process goes to step 7-*j*. Character information and coordinate information are stored in the memory unit at step 7-*i*. Whether or not the image processing apparatus control code is finished is determined at the step 7-*j*. When the image processing apparatus control code is not finished at step 7-*j*, the process returns to step 7-*h* and executes processing for a next image processing apparatus control code, and when it is finished at step 7-*j*, the process goes to step 7-*k*. A document image (image data by which a person can visually grasp the outline of a document) is created at step 7-*k*, and the processing of FIG. 7 is finished.

Next, the history information creation processing flow executed in the history information management processing will be explained using FIG. 8. Whether or not character information is stored in the memory unit is determined at step 8-*a*. When character information is stored therein, the process goes to step 8-*b*, and when character information is not stored therein, the process goes to step 8-*j*. The stored character and coordinate information is read out from the memory unit at step 8-*b*. Character groups having a high probability of creating a sentence judging from a character rotation angle, a page rotation angle, character congestion, and the like are extracted at step 8-*c*. The respective character groups are aligned in a coordinate value sequence at step 8-*d*. The aligned character groups are converted into text at step 8-*e*. The created text is used as history information at step 8-*f*. Host information of a source from which a job is input is acquired at step 8-*g*. The history information is related to the host information and they are stored in the memory unit at step 8-*h*. The history information is related to the document image and the document image is transmitted to a storage at step 8-*i*, and the processing of FIG. 8 is finished. When it is determined at step 8-*a* that character information is not stored therein, a document arrangement feature is created from a drawing command in the image processing apparatus control code at step 8-*j*. The created document arrangement feature is used as a history information at step 8-*k*, and then performs steps 8-*g*-8-*i* as described above. The processing of FIG. 8 then ends.

Next, an example of the concept of the job search processing (job chasing) will be explained using FIG. 9. In the example, when the user inputs a keyword "music" to the server, the history information management device reads out user relating information related to a history "music" from the memory unit, stores a thumb-nail, and displays the acquired user relating information and the thumb-nail on the screen of the server. With this operation, the user can grasp the jobs and the user information related to the history information "music".

Next, the job chasing processing flow executed in the history information management processing will be explained using FIG. 10. Words that frequently appear in the history in the memory unit are searched (extracted) at step 10-*a*, and the frequently appearing words are output to (displayed on) an external output interface such as a display unit and the like in a form which can be confirmed by the user at step 10-*b*. Steps 10-*a* and 10-*b* permit the user to select a keyword displayed on the display unit without taking a keyword that the user desires to search into consideration, thus a load imposed on the user can be reduced. Next, the user inputs a search keyword at step 10-*c*, the history information management device specifies a job in agreement with the keyword by searching the history stored in the memory unit at step 10-*d*, reads out the user information corresponding to the history information from the memory unit at step 10-*e*, reads out the document image corresponding to the history information from the memory unit in which the document image is stored at step 10-*f*, and displays the user information and the document image on the external output interface such as the display unit and the like at step 10-*g*. Processing of FIG. 10 is then finished.

Second Example

Figure 13:
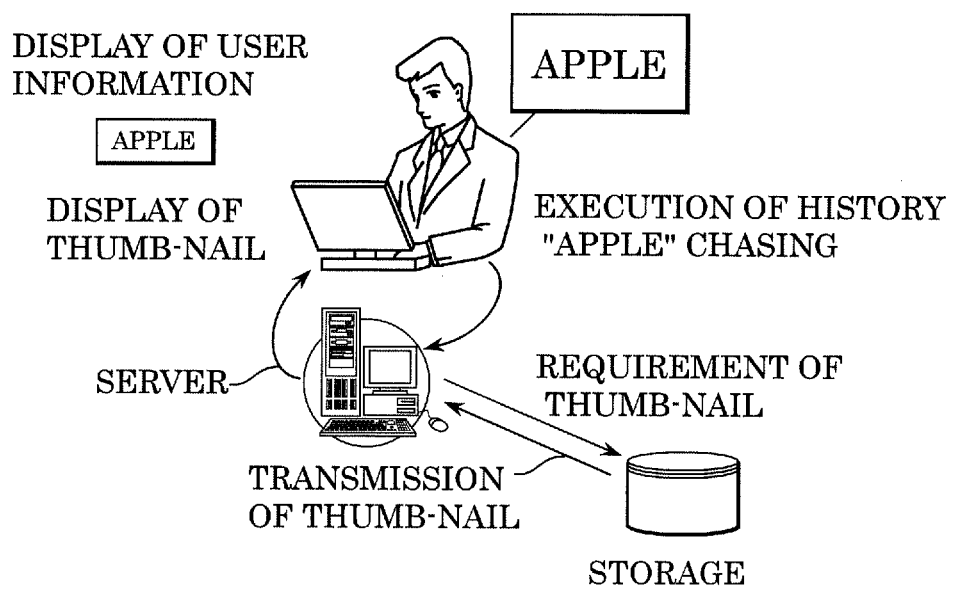
FIG. 13 is a view showing an example of the concept of job search processing (job chasing) according to the second example.

An example of a case that an image processing apparatus control code, which uses, in particular, a page division region, is used in the history information management processing in the image processing system explained in the first example is explained next with reference to FIGS. 11 to 13.

Figure 11:
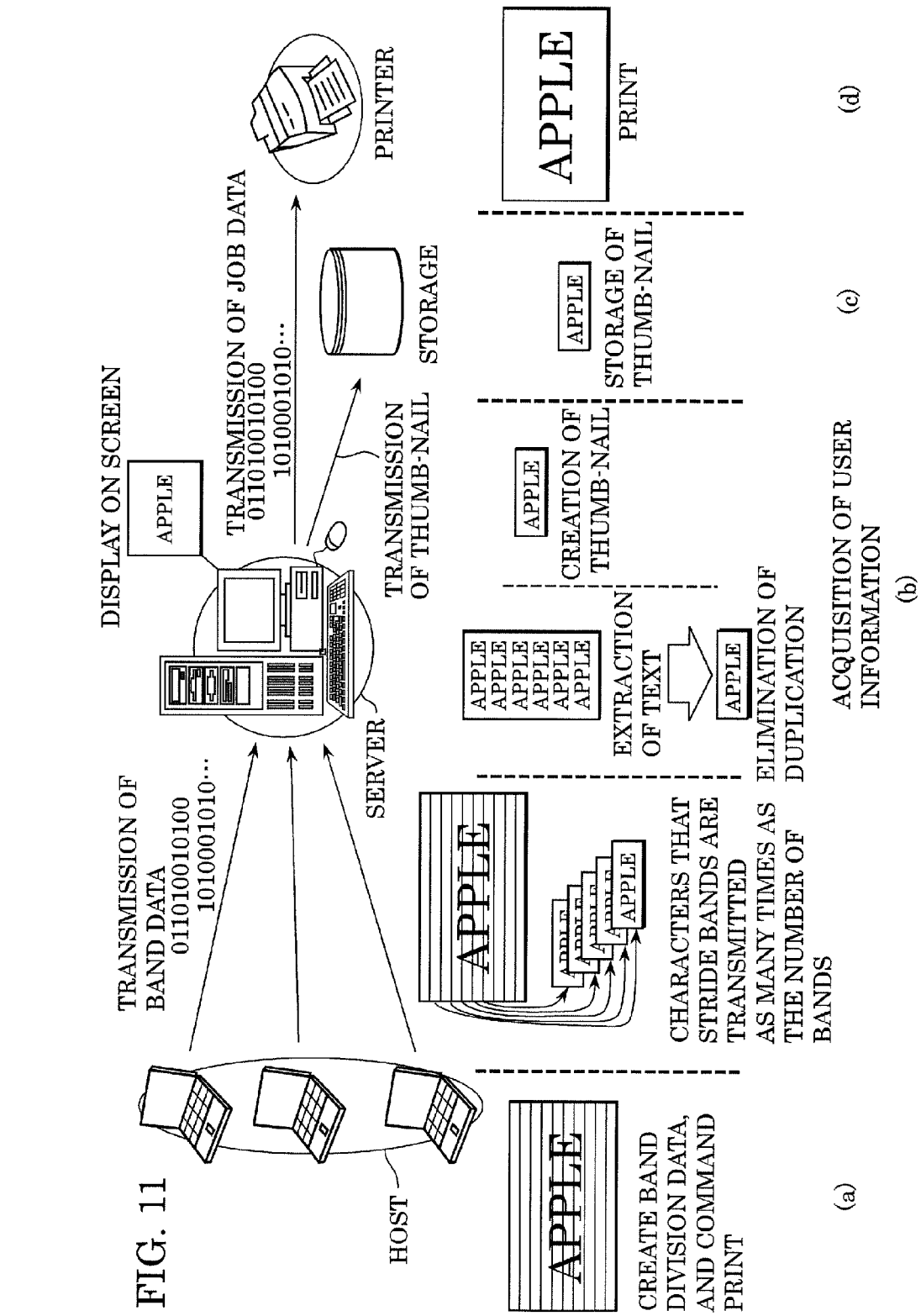
FIG. 11 is a view showing an example of the concept of duplicated text elimination processing according to a second example executed in history information acquisition processing executed in respective devices of an image processing system.

FIG. 11 shows an example of the concept of duplicated text elimination processing executed in the history information acquisition processing in the respective devices of the image processing system, wherein (a) to (d) show the contents of processing executed by the respective devices. FIG. 12 shows an example of a history information acquisition preparation processing flow executed in the history information management processing, wherein 12-*a* to 12-*q* show respective steps. FIG. 13 shows an example of the concept of job search processing (job chasing).

First, an overview of the duplicated text elimination processing executed in the history information acquisition processing in the respective devices of the image processing system is explained with reference to FIG. 11. In the example, a host receives a print command from a user in (a) of the figure and creates job data (image processing apparatus control code) having a data structure divided into bands (page divided regions). When character data included in a document strides the bands, the same character data is duplicated in job data as many times as the number of the bands strode by the character data. The host sends the created job data of each band to a server. The server extracts text data from the job data received in (b) of the figure. When the extracted text data is duplicated, duplication elimination processing is executed, duplication eliminated text data is displayed on a screen, a thumb-nail is created and transmitted to a storage device, and the job data is transmitted to a LBP. The storage stores the thumb-nail received in (c) of the figure. The LBP executes print processing by creating an image from the job data received in (d) of the figure.

Next, the history information acquisition preparation processing flow executed in the history information management processing will be explained using FIG. 12. Although the history information acquisition preparation processing flow in the first example is shown in FIG. 7 and described above, the flow shown in FIG. 12 is used in the second example. Whether or not the job data (image processing apparatus control code) includes glyph data is determined at step 12-*a*. When the job data includes glyph data, the process goes to step 12-*c*, and when the job data does not include glyph data, the process goes to step 12-*h*. Processing for analyzing the image processing apparatus control code is repeated in a loop from step 12-*c* to step 12-*f*. When glyph data is detected at step 12-*c*, the process goes to step 12-*d*, and when glyph data is not detected at step 12-*c*, the process goes to step 12-*f*. The glyph data is subjected to character recognition processing at the step 12-*d*, the glyph data is caused to correspond to a character, and they are registered as a font at step 12-*e*. Whether or not the image processing apparatus control code is finished is determined at step 12-*f*. When the image processing apparatus control code is not finished at step 12-*f*, the process returns to step 12-*c* and processes a next image processing apparatus control code, and when it is finished at step 12-*f*, the process goes to step 12-*h*. Processing for analyzing the image processing apparatus control code is repeated in the loop from step 12-*h* to step 12-*j*. When character drawing data is detected at step 12-*h*, the process goes to step 12-*i*, and when character drawing data is not detected at step 12-*h*, the process goes to step 12-*j*. Character information and coordinate information are stored in a memory unit at step 12-*i*. Whether or not the image processing apparatus control code is finished is determined at the step 12-*j*. When it is not finished at step 12-*j*, the process returns to step 12-*h* and processes a next image processing apparatus control code, and when it is finished at step 12-*j*, the process goes to step 12-*k*. Whether or not character information is stored in the memory unit is determined at step 12-*k*, and when the character information is stored therein, the process goes to step 12-*m*, whereas when the character information is not stored therein, the process goes to step 12-*q*. Processing for analyzing the stored character information is repeated in the loop from step 12-*m* to step 12-*p*. When the same character is detected at step 12-*m*, the process goes to step 12-*n*, otherwise the process goes to step 12-*p*. When characters having the same coordinate value are detected at step 12-*n*, the process goes to step 12-*o*, otherwise, the process goes to step 12-*p*. These characters are regarded as duplicated characters at step 12-*o*, and duplicated character data is deleted. Whether or not the stored character information is finished is determined at the step 12-*p*. When the stored character information is not finished at step 12-*p*, the process returns to step 12-*m* and processes a next image processing apparatus control code, otherwise, the process goes to step 12-*q*. A document image is created at step 12-*q*, and the processing of FIG. 12 is finished.

Next, an example of the concept of the job search processing (job chasing) is explained with reference to FIG. 13. In the example, when the user inputs a keyword "apple" to the server, a history information management device reads out user relating information related to a history "apple" from the memory, writes a thumb-nail to the storage device, and displays the acquired user relating information and the thumb-nail on the screen of the server. With this operation, the user can grasp the jobs and the user information related to the history information "apple".

Third Example

Examples of a user interface and text extraction processing when the history information management processing is executed in the image processing system using the LBP described in the above examples is described next with reference to FIGS. 14 to 16.

Figure 14:
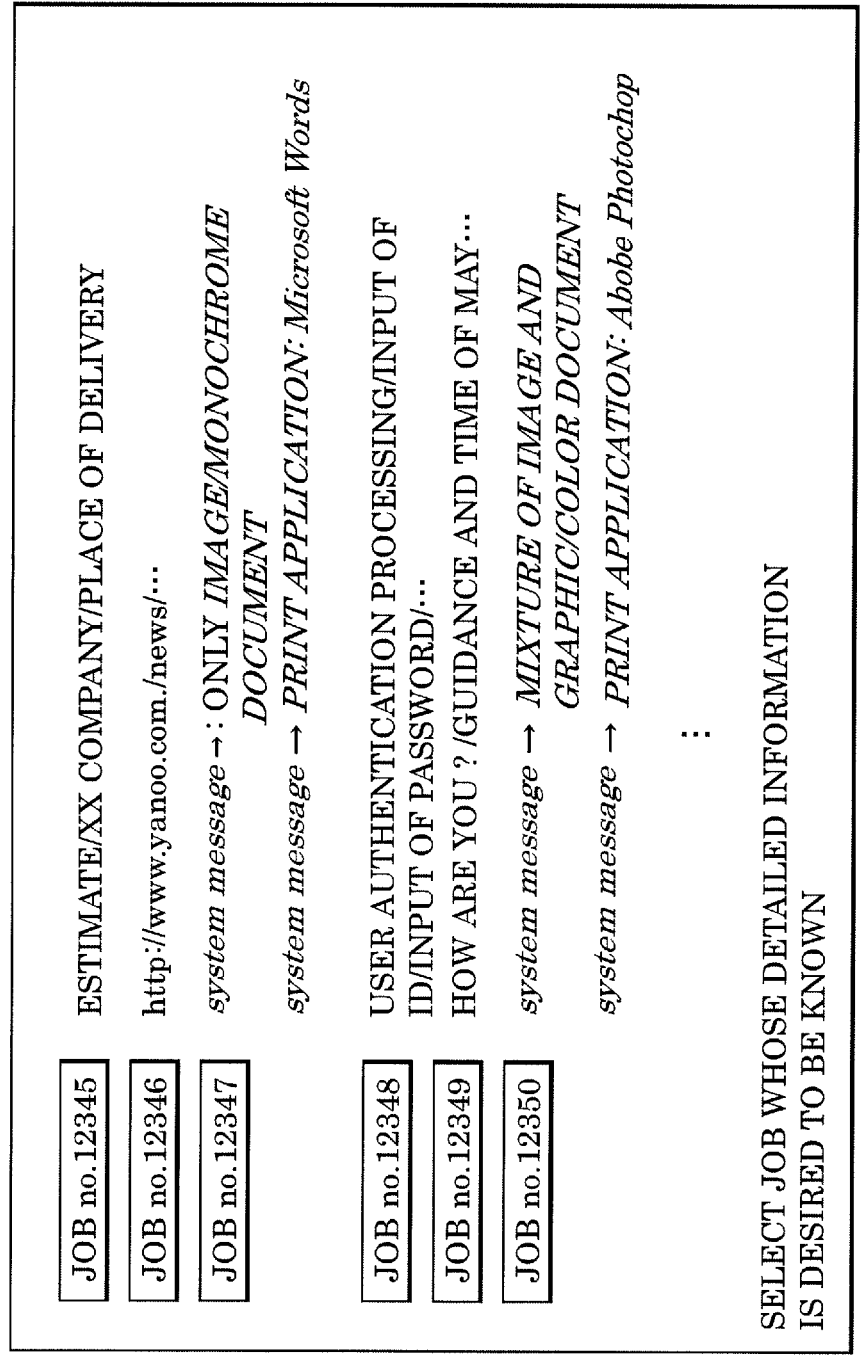
FIG. 14 is a view showing an example of a history display according to a third embodiment presented to a user by a history information management device.
Figure 15:
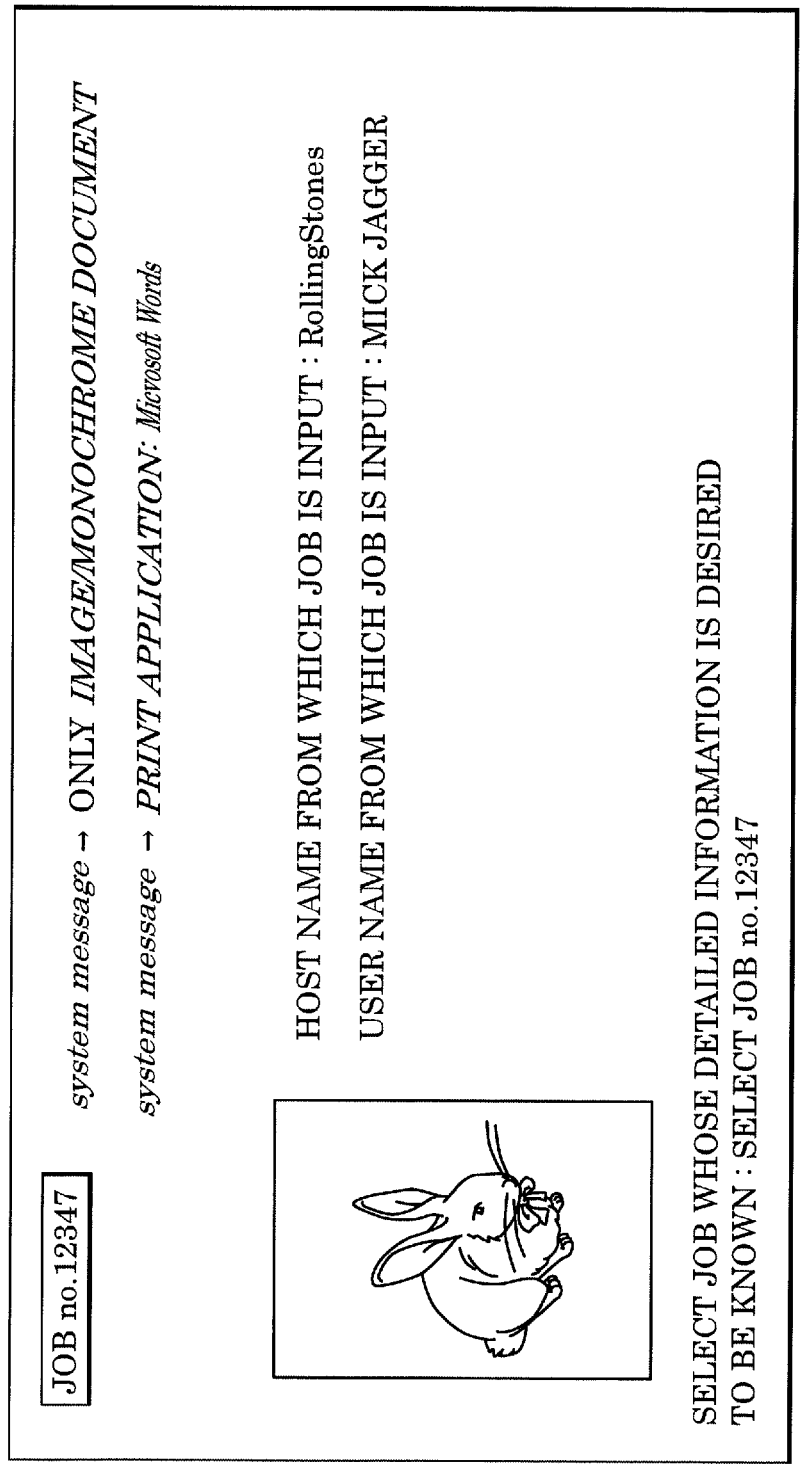
FIG. 15 is a view showing an example of a display according to the third embodiment presented to the user by the history information management device when the user executes a job search processing.

FIG. 14 shows an example of a history display presented by a history information management device to the user. FIG. 15 shows an example of the display presented by the history information management device to the user when the user executes job search processing. FIG. 16 shows an example of the concept of the text extraction processing.

An example of the history display presented to the user by the history information management device is described next with reference to FIG. 14. The history information management device causes job numbers to correspond to the contents of the histories of respective jobs and displays them on a screen. The contents of the histories to be displayed are text information when it exists in the histories, and when the text information does not exist therein, document arrangement features and types of a print application. When the user inputs a job number with reference to the above information, he or she can obtain an identity of the person who input the job and the document image of the job (job search processing). FIG. 15 shows the example of the display presented by the history information management device to the user as the result of the job search processing, and a host to which the job was input, an identification of the person who input the job (user name), and a document image are displayed.

Next, an example of text extraction processing is described with reference to FIG. 16. A case in which characters exist as shown in the figure will be examined. In a character group 1, the inclination of respective characters is detected in (a). Next, the degree of congestion of the respective characters is detected in (b). Since the respective characters congest to some extents, the character group 1 can be regarded as a text character train candidate in its entirety. However, it is regarded that only the character "f" is not included in the character train because the vector of it is different from that of the other characters. Next, the characters are picked up from the character train in the sequence where they are directed and aligned in (c). Next, text "abcde/f" is obtained by converting the result of alignment into text, and the text extraction processing is finished. In a character group 2, the inclination of respective characters is detected in (e). Next, the degree of congestion of the respective characters is detected in (f). Since the respective characters are scattered in this case, the character group 2 is not regarded as a character train. Next, the characters are picked up from the character group 2 in the sequence where they are directed and aligned in (g). Next, text "a/b/c" is obtained by converting the result of alignment into text in (h), and then the text extraction processing is finished.

As described above, according to the example, an image processing method of the present invention has an extraction step of extracting text data and image forming data based on an image processing apparatus control code (for example, PDL: page description language) as the job and storing step of relating the text data to the image forming data and storing them in a memory unit. The image forming data is a thumb-nail, graphic data, object data, and the like. The image processing apparatus control code is output to an image recording device (for example, LBP). A corresponding job is searched based on the text data with reference to the memory unit.

Image data by which the outline of an image can be grasped based on the image processing apparatus control code is created as the document image, and the image data is, for example, the thumb-nail. As shown in FIG. 17, the information of the job (job ID), the text data, the image formation data, the image processing apparatus control code, the image data (document image), and the job issuing source (the information of the unit which issued the image processing apparatus control code or user information) are stored in the memory unit by being related to each other. The above information is entirely or partly output to an output unit (for example, a display unit).

As shown in FIG. 18, a character drawing command is extracted from the image processing apparatus control code, and text data is extracted by converting the character drawing command into text data. There are two extraction methods.

In a first method, an image processing apparatus stores font data, and subjects the font data, which is designated by a font data designation code in the image processing apparatus control code, to image processing. In this case, the font data designation code in the image processing apparatus control code is converted into text data.

In a second method, the image processing apparatus registers glyph data in the image processing apparatus control code as font data, and the font data, which is designated by the font data designation code in the image processing apparatus control code, is subjected to image processing. In this case, the glyph data is subjected to character recognition, and the font data designation code in the image processing apparatus control code is converted into text data.

Figure 16:
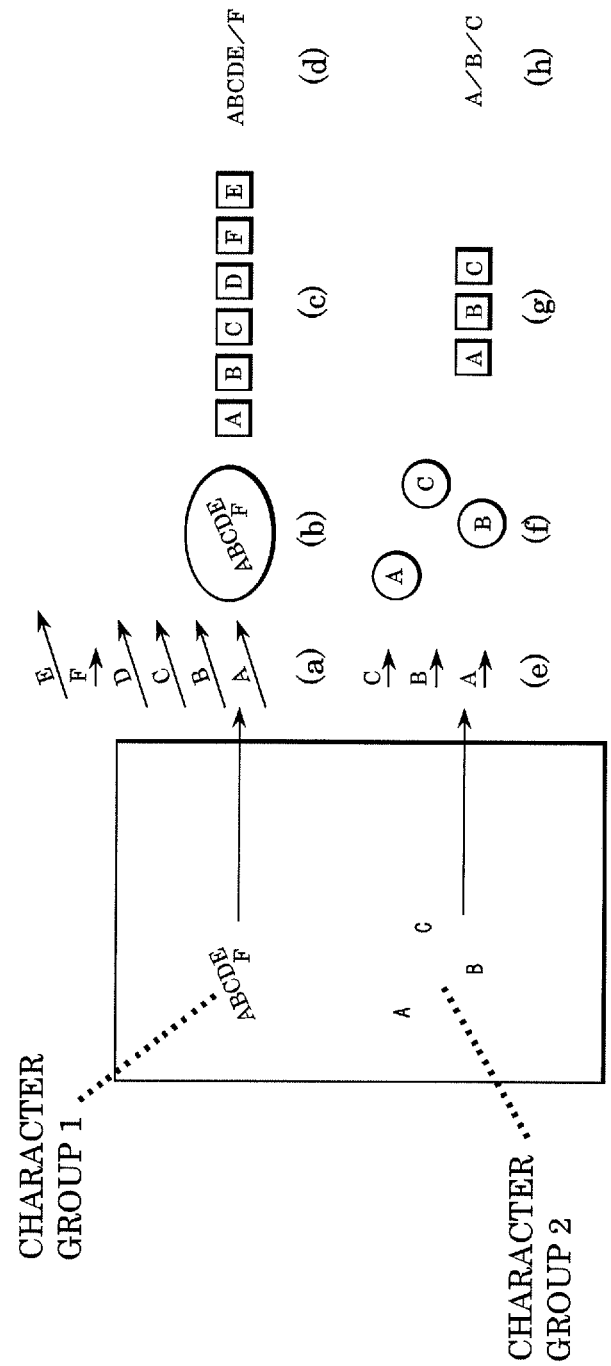
FIG. 16 is a view showing an example of the concept of text extraction processing according to the third example.

As shown in FIG. 16, the coordinate values used by a character drawing command in the image processing apparatus control code can be extracted, the font data can be aligned in the sequence of a predetermined direction of the coordinate values, and an aligned font data group can be converted into text data. The inclination of the font data group can be derived from the coordinate values, and the font data can be aligned in the sequence of inclining direction thereof. Further, the traveling direction (vector) of the font data group can be detected by detecting the rotational direction of the font data, and the font data can be aligned in the sequence of the traveling direction thereof. In the PDL, the character drawing command includes the coordinate value and the rotational angle of the font data (glyph data). Further, the traveling direction (vector) of the font data group can be detected by detecting the rotational direction of a page constituting a job, and the font data can be aligned in the sequence of the traveling direction thereof.

As shown in FIG. 11, the image processing method includes an output step of outputting an image processing apparatus control code for each page divided region (band) to the image processing apparatus, a detection step of detecting font data existing in duplication in each page divided region, and an extraction step of extracting text data by eliminating the duplication of the detected font data based on the image processing apparatus control code. In this case, when the same font data is designated in a plurality of page divided regions as well as when the same drawing position is designated, it can be detected that the font data is duplicated.

As shown in FIG. 17, the information of the job, the text data, and the image forming data may be related to each other and stored in the same memory unit, or the text data and the image forming data may be stored in different memory units.

When the text data is stored in the memory unit, the text data is output, and when the text data is not stored in the memory unit, both of or any one of the image forming data and the document image is output to the output unit. Further, as shown in FIG. 10, text data that appears frequently in a plurality of jobs is output to the output unit.

Text data which is in agreement with the text data input by the user is searched from the memory unit, and a job issuing source related to the text data is read out from the memory unit and displayed. Further, as shown in FIG. 14, a job selected from the text data or the image forming data of a plurality of jobs output to the output unit is selected, and the job issuing source corresponding to the selected job is read from the memory unit and displayed. Further, text data or image forming data is searched based on the information of the job with reference to the memory unit.

As described above, according to the first to third examples, there can be obtained an effect of acquiring the information relating to a user who input a job, job data, and the document image of the job data from the history of the job in the image processing system executing image processing by sending the image processing apparatus control code from the host to the image processing apparatus. Further, there can be obtained an effect of acquiring the history of a job and the information relating to a user input the job from job data.

Further, since the data in the job data is selectively used as a history, there can be obtained an effect of reducing an amount of history information handled by the user when he or she executes search using the history information, and thus a load imposed on the user can be reduced.

Further, in the image processing system that executes the image processing by sending the image processing apparatus control code from the host to the image processing apparatus, the information relating to a user who input a particular job can be obtained by effectively searching the particular job from a lot of the histories of jobs.

The embodiment can be realized by a computer that executes a program. Further, means for supplying the program to the computer, for example, a recording medium such as a CD-ROM and the like on which the program is recorded and which can be read by the computer or a transmission medium such as the Internet which transmits the program can be also applied as the embodiment of the present invention.

Furthermore, a computer program product such as a recording medium and the like on which the program is recorded and which can be read by the computer can be also applied as the embodiment of the present invention. The program, the recording medium, the transmission medium, and the computer program product are included in the scope of the present invention. A flexible disc, hard disc, optical disc, magneto-optic disc, CD-ROM, magnetic tape, non-volatile memory card, ROM, and the like, for example, can be used as the recording medium.

Since the above examples show only specific examples for embodying the present invention, the interpretation of the technical scope of the present invention should not be restricted by the examples. More specifically, the present invention can be embodied in various fashions without departing from the technical idea and the leading features thereof.

While the present invention has been described with respect to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing method, comprising:
a reception step of receiving a job comprising a plurality of job data created for bands corresponding to a document;
an extraction step of extracting text data and image forming data based on image processing apparatus control code for the job;
a storing step of relating information of the job, the text data, and the image forming data to each other and storing them in a memory unit as a history of the job; and
an output step of outputting the image processing apparatus control code to an image processing apparatus,
wherein the image processing apparatus stores font data and subjects the font data designated by a font data designation code in the image processing apparatus control code to image processing, and
wherein, if given text data strides the bands, duplicate font data designation code in the image processing apparatus control code is deleted among the plurality of job data corresponding to the document and the font data designation code without duplication is extracted and said given text data is extracted by converting the font data designation code at the extraction step.

2. An image processing method according to claim 1, wherein coordinate values used by a character drawing command in the image processing apparatus control code are extracted, font data is aligned in a sequence of a predetermined direction of the coordinate values, and an aligned font data group is converted into text data at the extraction step.

3. An image processing method according to claim 2, wherein an inclination direction of the font data group is derived from the coordinate values, and the font data is aligned in a sequence of the inclination direction at the extraction step.

4. An image processing method according to claim 2, wherein a traveling direction of the font data group is detected by detecting a rotational direction of the font data, and the font data is aligned in a sequence of the traveling direction at the extraction step.

5. An image processing method according to claim 2, wherein a traveling direction of the font data group is detected by detecting a rotational direction of a page constituting the job and the font data is aligned in a sequence of the traveling direction at the extraction step.

6. An image processing method according to claim 1, further comprising:
a creation step of creating image data capable of grasping an outline of an image based on the image processing apparatus control code,
wherein the information of the job, the text data, the image forming data, and the image data are related to each other and stored in the memory unit at the storing step.

7. An image processing method according to claim 1, further comprising a search step of searching the text data or the image forming data stored in the memory unit based on the information of the job.

8. A non-transitory computer-readable medium having stored thereon a control program, causing a computer to execute the image processing method according to claim 1.

9. An image processing apparatus, comprising:
a reception unit configured to receive a job comprising a plurality of job data created for bands corresponding to a document;
an extraction unit configured to extract text data and image forming data based on image processing apparatus control code for the job;
a storing unit configured to relate information of the job, the text data, and the image forming data to each other and store them in a memory unit as a history of the job; and
an output unit configured to output the image processing apparatus control code to the image processing apparatus,
wherein the image processing apparatus stores font data and subjects the font data designated by a font data designation code in the image processing apparatus control code to image processing, and
wherein, if given text data strides the bands, duplicate font data designation code in the image processing apparatus control code is deleted among the plurality of job data corresponding to the document and the font data designation code without duplication is extracted and said given text data is extracted by converting the font data designation code into text data at the extraction step.

* * * * *